US012809151B2

(12) United States Patent
Kuehn et al.

(10) Patent No.: US 12,809,151 B2
(45) Date of Patent: Nov. 24, 2026

(54) MULTI-WAVELENGTH LASER BEAM PATTERN GENERATOR WITH AUTOMATED BEAM ALIGNMENT

(71) Applicant: Modulight Corporation, Tampere (FI)

(72) Inventors: Sergei Kuehn, Tampere (FI); Petteri Uusimaa, Tampere (FI); Anna Essaulova, Tampere (FI)

(73) Assignee: Modulight Corporation, Tampere (FI)

( * ) Notice: Subject to any disclaimer, the term of this patent is extended or adjusted under 35 U.S.C. 154(b) by 302 days.

(21) Appl. No.: 18/510,914

(22) Filed: Nov. 16, 2023

(65) Prior Publication Data

US 2025/0164769 A1 May 22, 2025

(51) Int. Cl.
*G02B 21/00* (2006.01)
*G02B 27/14* (2006.01)

(52) U.S. Cl.
CPC ....... *G02B 21/008* (2013.01); *G02B 21/0048* (2013.01); *G02B 21/0064* (2013.01); *G02B 27/141* (2013.01)

(58) Field of Classification Search
CPC .............. G02B 21/008; G02B 21/0048; G02B 21/0064; G02B 27/141; G02B 26/0833;
(Continued)

(56) References Cited

U.S. PATENT DOCUMENTS 1,083,014 A 12/1913 Hobbs
8,267,532 B2 9/2012 Khechana et al.
(Continued)

FOREIGN PATENT DOCUMENTS

WO WO-02093202 A2 * 11/2002 ............ G02B 21/32

OTHER PUBLICATIONS

European Patent Office, International Search Report, Application No. PCT/FI2024/050615, mailed Feb. 20, 2025, 6 pages.

*Primary Examiner* — Mustak Choudhury
(74) *Attorney, Agent, or Firm* — Ziegler IP Law Group, LLC

(57) ABSTRACT

Example embodiments provide a biomedical illumination device enabling multiwavelength laser line generation with automated beam alignment. The biomedical illumination device may include a plurality of laser light sources configured to provide beams of one or more wavelengths, wherein one or more of the beams are directed towards one or more actuator-controlled mirrors; the one or more actuator-controlled mirrors configured to steer the one or more beams for passing through a beam shaping element, wherein for each of the one or more beams at least one actuator-controlled mirror is configured for steering the respective beam automatically according to instructions received from a control device; the beam shaping element configured to output a beam pattern having a certain geometry for illumination of a microscopic sample based on the steered beams; and the control device configured to monitor the beams output from the beam shaping element to determine a position of the output beam pattern in relation to a target beam pattern position at the sample; determine instructions for one or more of the actuator-controlled mirrors to tilt in at least one axis based on a difference between the monitored position of the output beam pattern and the target beam pattern position at the microscopic sample; and transmit the instructions to the one or more actuator-controlled mirrors.

20 Claims, 4 Drawing Sheets

(58) Field of Classification Search

CPC ............ G02B 27/0944; G02B 27/1006; G02B 27/108; G02B 21/06; G02B 21/082; G02B 27/0933; G01J 2003/102; G01J 2003/104; G01J 3/021; G01J 3/0237; G01J 3/0248; G01J 3/0289; G01J 3/10; G01J 3/18; G01N 15/1434

See application file for complete search history.

(56) References Cited

U.S. PATENT DOCUMENTS

| | | | |
|---|---|---|---|
| 10,338,354 B2 | 7/2019 | Meng et al. | |
| 10,831,014 B2 | 11/2020 | Hillman | |
| 2019/0196172 A1* | 6/2019 | Hillman ............. | G02B 21/0052 |
| 2022/0163786 A1* | 5/2022 | Hargis .................. | B81B 3/0067 |
| 2023/0375404 A1 | 11/2023 | Bendick et al. | |

* cited by examiner

MULTI-WAVELENGTH LASER BEAM PATTERN GENERATOR WITH AUTOMATED BEAM ALIGNMENT

TECHNICAL FIELD

The present application generally relates to biomedical applications. Some example embodiments of the present application relate to an illumination system of a medical device, such as a flow cytometer or gene sequencer.

BACKGROUND

Flow cytometry is an analysis method used in biological research and diagnostics for rapid particles or cells analysis and characterization. Flow cytometry may be composed of three subsystems: optical, fluidical and electronical. Similar functions are used also in fluorescence labelling based gene sequencing systems. Various biomedical applications, such as the flow cytometry and gene sequencing, may require precise illumination for microfluid components. Hence, it would be beneficial to provide improvements at least for the optical subsystems of biomedical devices.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide a biomedical illumination device with an integrated beam shaping element and an automated beam steering system. The biomedical illumination device may be modular such that its components are replaceable at the end of their lifetime or due to changed beam shape requirements. The biomedical illumination device may enable automatic monitoring, tracking and correction of beam geometry continuously and on a long-time scale. Hence, faster beam-alignment and re-configuration may be provided, without a need for manual intervention by an operator. According to a first aspect a biomedical illumination device is provided. The biomedical illumination device comprises a plurality of laser light sources configured to provide beams of one or more wavelengths, wherein one or more of the beams are directed towards one or more actuator-controlled mirrors; the one or more actuator-controlled mirrors configured to steer the one or more beams for passing through a beam shaping element, wherein for each of the one or more beams at least one actuator-controlled mirror is configured for steering the respective beam automatically according to instructions received from a control device; the beam shaping element configured to output a beam pattern for illumination of a microscopic sample based on the steered beams; and the control device configured to monitor the beams output from the beam shaping element to determine a position of the output beam pattern in relation to a target beam pattern position at the microscopic sample; determine instructions for one or more of the actuator-controlled mirrors to tilt in at least one axis based on a difference between the monitored position of the output beam pattern and the target beam pattern position at the microscopic sample; and transmit the instructions to the one or more actuator-controlled mirrors.

According to an example embodiment of the first aspect, the actuator-controller mirror comprises a microelectromechanical system, MEMS, mirror.

According to an example embodiment of the first aspect, the beam shaping component comprises a diffractive optical element, DOE or a refractive optical element, ROE.

According to an example embodiment of the first aspect, the biomedical illumination device further comprises at least one actuator-controlled mirror configured for steering the whole output beam pattern and positioned at least one of between the beam shaping element and the microscopic sample or between the one or more actuator-controlled mirrors and the beam shaping element; and wherein the control device is further configured to transmit instructions for the at least one actuator-controlled mirror configured for steering the whole beam pattern based on the difference.

According to an example embodiment of the first aspect, the biomedical illumination device further comprises one or more dichroic beam combiners configured to guide the beams from the actuator-controlled mirrors to the beam shaping element.

According to an example embodiment of the first aspect, the biomedical illumination device comprises a beam sampler configured to provide a sample of the output beams to the control device for monitoring of the position of the output beam pattern.

According to an example embodiment of the first aspect, the biomedical illumination device has a modular structure.

According to an example embodiment of the first aspect, the control device is further configured to perform power calibration of the plurality of laser light sources based on the monitored output beams.

According to an example embodiment of the first aspect, the beam shaping element is configured to output at least one of a line pattern, a grid pattern, a circular pattern, or a ring pattern of beams.

According to an example embodiment of the first aspect, the biomedical illumination device comprises an actuator-controlled lens system configured for size adjustment of the beam pattern; and wherein the control device is further configured to control the actuators of the lens system based on the monitored output beams and target size data.

According to a second aspect, a method is provided. The method comprises providing, by a plurality of laser light sources, beams of one or more wavelengths, wherein one or more of the beams are directed towards one or more actuator-controlled mirrors; steering, by the one or more actuator-controlled mirrors, the one or more beams for passing through a beam shaping element, wherein for each of the one or more beams at least one actuator-controlled mirror is configured for steering the respective beam automatically according to instructions received from a control device; outputting, by the beam shaping element, a beam pattern for illumination of a microscopic sample based on the steered beams; monitoring, by the control device, the beams output from the beam shaping element to determine a position of the output beam pattern with respect to a target beam pattern position at the microscopic sample; determining, by the control device, instructions for one or more of the actuator-controlled mirrors to tilt in at least one axis based on a difference between the monitored position of the output beam pattern and the target beam pattern position at the microscopic sample; and transmitting, by the control device, the instructions to the one or more actuator-controlled mirrors.

According to an example embodiment of the second aspect, the actuator-controller mirror comprises a microelectromechanical system, MEMS, mirror.

According to an example embodiment of the second aspect, the beam shaping component comprises a diffractive optical element, DOE, or a refractive optical element, ROE.

According to an example embodiment of the second aspect, the method further comprises steering the whole output beam pattern by at least one actuator-controlled mirror positioned at least one of between the beam shaping element and the microscopic sample or between the one or more actuator-controlled mirrors and the beam shaping element; and transmitting, by the control device, instructions for the at least one actuator-controlled configured for steering the whole beam pattern based on the difference.

According to an example embodiment of the second aspect, the method comprises guiding the beams from the actuator-controlled mirrors to the beam shaping element by one or more dichroic beam combiners.

According to an example embodiment of the second aspect, the method comprises providing, by a beam sampler, a sample of the output beams to the control device for monitoring of the position of the output beam pattern.

According to an example embodiment of the second aspect, the biomedical illumination device has a modular structure.

According to an example embodiment of the second aspect, the method comprises performing, by the control device, power calibration of the plurality of laser light sources based on the monitored output beams. According to an example embodiment of the second aspect, the beam shaping element is configured to output at least one of a line pattern, a grid pattern, a circular pattern, or a ring pattern of beams.

According to an example embodiment of the second aspect, the method comprises controlling, by the control device, actuators of an actuator-controlled lens system configured for size adjustment of the beam pattern based on the monitored output beams and the target size data.

Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like references are used to designate like parts in the accompanying drawings.

DETAILED DESCRIPTION

Figure 1:
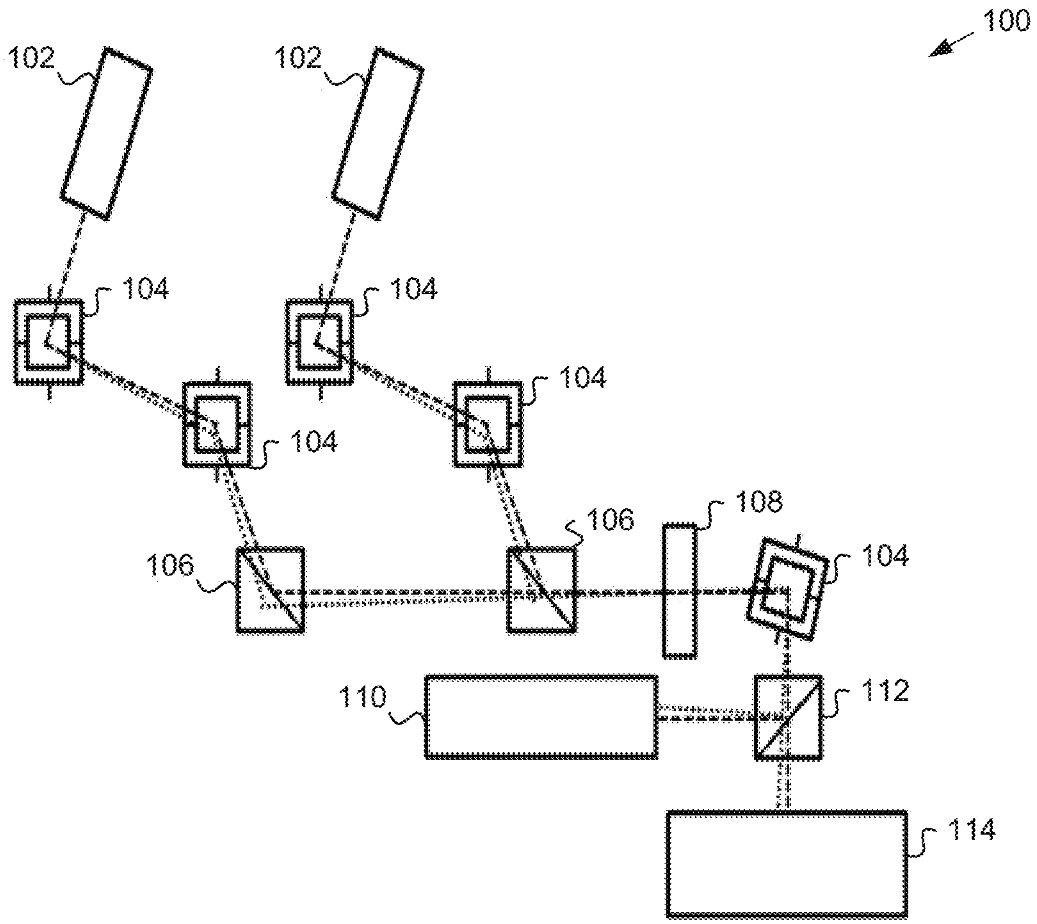
FIG. 1 illustrates an example of a biomedical illumination device according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

An objective is to improve capabilities and simplicity of operation for beam steering in biomedical illumination applications. This may be achieved with integrated beam shaping and automated beam alignment configurable to a biomedical illumination device.

According to an example embodiment, an illumination device is provided for automatic monitoring, tracking and correction of beam geometry. The monitoring, tracking and correction operations can be performed by the illumination device on a long-time scale. For example, the illumination device may be configured to perform repeated beam alignment and/or periodic calibrations automatically without user intervention. The illumination system may enable to eliminate stability issues and a need for system disassembly each time adjustment of a laser beam is required. Further, a software-based adjustment and configuration of individual beam components is enabled, for example, in case of multicolour flow cytometry.

The illumination device may be applicable for various biomedical applications. The illumination device may provide a precise illumination source for microfluidic components. The biomedical applications may comprise, for example, flow cytometry, DNA sequencing, and cell sorting. For example, in an example embodiment the e illumination device may provide an improved optical part to be used in a cytometer. However, application areas of the illumination device are not limited to the example biomedical applications, and the illumination device may be used also in other applications which may require precise excitation of a sample with multiple wavelengths.

Biomedical systems operating in changing environments may require repeated alignment and periodic calibrations. Introduction of automated alignment into such systems may abolish the need of regular manual system re-calibrations. As a result, operational lifespan of the device may be increased, and the risks of internal components damages associated with manual interference into the system may be decreased. Moreover, the illumination device described herein may enable to abolish a need for external power calibration, since it may be possible to have a power calibration integrated into the illumination system. The integrated power calibration may speed up the time needed to set up the biomedical illumination device running. No physical intervention by an operator may be needed. Modules of the illumination system may be replaceable such that swapping of the modules at the end of their lifetime can be done easily.

For example, in case of a flow cytometer, a laser beam may be focused on a flow cell through which focused particle cell is streaming. Due to the versatility of flow cells designs, positioning of laser beams may need to be adjusted in x and y directions of the focusing plane. Further, positioning may be performed in z direction to adjust the focusing plane. Moreover, depending on whether a temporal or spatial laser beam separation is utilized in the particular cytometer model, the laser beams either may need to be focused to the same spot or be focused separately on the flow cell.

Introduction of an automated beam steering for each separate laser line to the cytometry laser platform may offer a possibility to adjust the focus of individual lasers depending on the cytometer requirements. Further, with utilization of actuator-controlled mirrors, beam steering can be done remotely without a need for an operator to access the system and make manual internal adjustments. The actuator-controlled mirrors may comprise, for example, microelectromechanical systems (MEMS) mirrors. In combination with utilization of beam shaping elements, such as diffractive optical elements (DOEs) or refractive optical elements (ROEs), the illumination device serves the purpose of being a self-adjustable flow cytometrical laser platform capable of precise flow cell regions excitation.

FIG. 1 illustrates an example of a biomedical illumination device 100 according to an example embodiment.

The biomedical illumination device 100 may comprise one or more light sources 102. A light source may be also referred to as an illumination source. A light source 102 may comprise a laser. The one or more light sources 102 may be configured to provide beams of one or more wavelengths. For example, the biomedical illumination device 100 may comprise a plurality of lasers providing laser beams of one or more color channels. A color channel may refer to a specific range of wavelengths or colors within the electromagnetic spectrum emitted by a light source.

The biomedical illumination device 100 may comprise at least one mirror 104. At least one mirror 104 may be configured for each color channel of the light sources 102. The mirrors 104 may be used to direct light beams coming from the light sources 102. Each of the mirrors 104 may be controlled by an actuator. Each of the mirrors 104 may be configured to rotate about one or more axis. The actuator may refer to an electronic device configured for producing a controlled motion or action in response to an input signal or command. The actuator-controller mirrors 104 may be configured to perform beam alignment. Beam alignment may refer to directing the beam toward a series of reflective or partially reflective surfaces, such as mirrors or lenses, so that the beam follows some predetermined path. For example, each of the actuator-controlled mirrors 104 may be configured to guide the respective beam via one or more optical elements (e.g., beam combiners or beam splitters) to pass through a beam shaping element 108. For example, the actuators may be configured to provide tip-tilt degrees of freedom, thereby controlling an angle and a position of the beam on the beam shaping element 108.

Tip-tilt degrees of freedom may refer to two specific types of motion in the context of optical systems, such as imaging devices. The tip-tilt degrees of freedom may enable achieving precise pointing of a beam. Tip movement may refer to rotation around a horizontal (x-)axis and tilt movement may refer to a rotation around a vertical (y-)axis. In general, an x-axis and a y-axis may refer to two perpendicular axes. The x-axis may refer to a horizontal axis along a reflective surface of the mirror and the y-axis may refer to an orthogonal, vertical axis along the reflective surface. In general, both tip and tilt may refer to tilting, turning or rotating around a specific axis. Tilt may refer to a deviation in the direction a beam of light propagates.

Each light source 102 may be configured to emit a beam towards one of the mirrors 104. In other words, the biomedical illumination device 100 may comprise at least one mirror 104 per a light source 102. In an embodiment, the biomedical illumination device 100 may comprise at least two actuator-controlled mirrors 104 for each light source 102, configured to steer a beam of the respective light source 102. Alternatively, only beams of one or more of the light sources 102 may be configured to be steered by one or more respective mirrors 104. A beam may be also referred to as a light beam or a laser beam. The mirror 104 with an actuator may be a MEMS mirror, i.e., an electromagnetic mirror incorporating MEMS technology. A MEMS mirror may be configured to deflect and move a focused beam upon exposure. A MEMS mirror may enable compact design and improved speed for beam steering. A MEMS mirror may provide a wide optical deflection angle, high mirror reflectivity and low power consumption.

The mirrors 104 may be configured to steer the beams according to received instructions towards the beam shaping element 108. The received instructions may comprise a desired position of the mirror 104. The received instructions may comprise, for example, instructions to change an angle of the mirror in one or more rotational axis. Each mirror 104 may be configured for a tip-tilt rotation in the xy-plane, e.g., to be rotated, turned or tilted about the x-axis or the y-axis with respect to an attachment point of the mirror 104. The mirrors 104 may be positioned such that the beams can be steered towards the beam shaping element. The beams may be steered towards the beam shaping element via the one or more optical elements. The mirrors 104 may be further configured to enable changing at least one of an angle or a position of the beams passing through the beam shaping element by rotation of the mirror.

The biomedical illumination device 100 may comprise the beam shaping element 108. The biomedical illumination device 100 may be configured to comprise one or more beam shaping elements 108. The integration of the beam shaping element(s) into the biomedical illumination device may provide a shaped beam as the output. Thus, a need for additional beam-shaping optical assembly may be eliminated and the system operation becomes feasible for operators without a relevant optical background. No manual alignment of several optical components by a trained operator may be required. Because there is no need for the time-consuming manual alignment, alignment of the several optical components can be performed by the biomedical illumination device more quickly and may not require regular verification. Further, alignments may be reliably repeated when using the biomedical illumination device with automatic beam alignment instead of using manual alignment.

The beam shaping element may comprise a diffractive optical element. A diffractive optical element may refer to an optical component designed to alter the amplitude or phase of light waves (beams) that pass through it. Light transmitted by a DOE can be reshaped to almost any desired distribution. A DOE may be used to encode the shape of a desired intensity pattern, while maintaining other parameters of the incident light source (e.g., beam size, divergence, polarization). Due to design flexibility of DOEs, DOEs can have optical functions which may not be otherwise achieved or can be achieved with more complicated optical systems. Moreover, compared to e.g. refractive optical elements, DOEs are typically much thinner and lighter, thus enabling more compact design.

However, the beam shaping element 108 may be also implemented by using a refractive optical element. Benefits of using a ROE, such as micro lens arrays, comprise the ability to use one ROE with a wider spectrum region compared to a DOE, for example. Hence, the number of used beam shaping elements may be decreased when a wider spectrum region is desired. A ROE may be configured to manipulate or control the direction and behavior of light. A ROE may comprise of materials with different refractive indices configured to cause the light to bend or refract when passing through the materials. A ROE may have for example curved surfaces (either concave or convex) which refract light in specific ways to achieve desired optical effects, such as beam shaping.

The biomedical illumination device 100 may be capable of generating a wide spectrum of possible beam shapes. The beam shape of the outcome beam(s) may depend on the used beam shaper element (e.g., DOE) 108. By selecting a DOE with appropriate properties, the biomedical illumination device may be configured to generate at least one of one or more lines, such as narrow lines, one or more grid patterns, one or more circular shapes or one or more ring patterns. A line beam shape may be used, for example, in flow cytometrical applications. A grid pattern may be used, for example, in DNA sequencing applications. The biomedical illumination device 100 may be also called a multi-wavelength laser beam pattern generator.

The biomedical illumination device 100 may further comprise one or more dichroic beam combiners 106. Beams of the light sources 102 may be configured to be steered via the mirrors 104 and the one or more dichroic beam combiners 106 to the beam shaping element 108. Each dichroic beam combiner 106 may be positioned between the mirror (s) 104 of a respective light source 102 and the beam shaping element 108. A dichroic beam combiner may refer to an optical component that selectively transmits or reflects different wavelengths or colors of light. A dichroic beam combiner may be configured to combine different spectral regions of light. A dichroic beam combiner may be, for example, a dichroic mirror or a dichroic filter.

Although FIG. 1 illustrates two light sources 102 and two dichroic beam combiners 106, and wherein two mirrors 104 are positioned between each light source and each dichroic beam combiner 106, the number of the respective components may be also different, depending on an implementation. The biomedical device 100 may comprise multiple light sources 102, multiple mirrors 104 and multiple dichroic beam combiners 106. The number of dichroic beam combiners may depend on the number of light sources, such that beams coming from one light source are guided through one or more mirrors dedicated for the light source to a dichroic beam combiner dedicated for the same light source. The biomedical illumination device 100 may further comprise one or more additional beam combiners for additional wavelengths.

The combined beams may be configured to be guided from the dichroic beam combiners 106 to the beam shaping element 108. The biomedical illumination device 100 may further comprise an additional mirror 104 with an actuator, such as a MEMS mirror. The additional mirror 104 may be positioned in the optical path of the beams after the beam shaping element 108, i.e., to an optical path of output beams of the beam shaping element 108. Alternatively, or in addition, the additional mirror 104 with an actuator may be positioned to an optical path of input beams to the beam shaping element 108. The additional mirror(s) 104 may enable to adjust the position of light pattern of the beams as a whole. The actuator of the additional mirror 104 may be configured to adjust position of the mirror 104 according to received instructions, similar as the actuator-controller mirrors 104 configured for individual steering of the beams and positioned before the beam shaping element 108, i.e., at an optical path of input beams of the beam shaping element 108.

Hence, depending on the amount and configuration of the actuator-controlled mirrors, e.g., MEMS mirrors, present in the biomedical illumination system 100, steering of the beams in various degrees of freedom can be achieved. The individual illumination beams, e.g., laser beams, can be steered in both axes (e.g., x- and y-axis with respect to a focusing plane), along with the whole beam pattern, which can include various wavelengths. An optimal MEMS mirrors configuration may depend on requirements of the application.

The additional mirror 104 may be configured to guide the beams coming from the beam shaping element (e.g., DOE) 108 to a beam sampler 112. A beam sampler may refer to an optical element configured to extract a portion of input beam(s) for analysis or measurement without significantly affecting the input beam(s). In other words, the beam sampler may enable to sample or monitor properties of a beam without disrupting a path or intensity of the beam. The biomedical illumination device 100 may comprise the beam sampler 112.

The biomedical illumination device 100 may comprise means for locking positions of the beams in place. For example, the biomedical illumination device 100 may comprise machine vision tools configured to operate with a feedback loop acting on the mirrors 104. The machine vision tools may be configured to provide instructions for the actuators, wherein the instructions determine positioning of the mirrors by the actuators. Machine vision tools may refer to hardware and/or software components configured for imaging-based automatic inspection and analysis for applications.

The biomedical illumination device 100 comprises an arrangement for beam alignment. The arrangement may comprise an integrated camera. The arrangement may be configured for aligning the illumination beam(s) according to an alignment mark with respect to a mechanical housing of the illuminator/light source. Alternatively, the illumination beams may be aligned based on an external alignment mark or a signal from a flow cell or one of sensors of a microfluidic system. This could be, e.g., a simple alignment routine to determine a maximum signal from forward scattering sensor for one of the beams and then align others with respect to the signal, or align all beams to separate sensors, or timely in series if the beams are located on same optical axis.

The biomedical illumination device 100 may comprise a control device 110. The control device 110 may comprise a detector, such as the camera, which is sensitive to positions of the beam(s). The control device 110 may be configured to sample the entire set of beams (guided via the mirrors and/or dichroic beam combiners from the light sources to the DOE) and measure the resulting position of illumination beams in a plane conjugate to a sample illumination plane. Hence, the control device 110 may be able to provide accurate information to manipulate source beams according to a targeted light pattern at the sample to be illuminated. The sample may be a microscopic sample. The beam sampler 112 may be configured to provide the sample of the beams to the control device 110. Illumination beams may refer to the beams focused to the sample. Source beams may refer to the beams configured to enter the beam shaping element 108, i.e., the beam shaping element 108 may be configured to reshape the source beams into the illumination beams.

For example, the control device 110 may be configured to run an algorithm of the machine vision tools. The control device 110 may be configured to provide instructions for beam alignment to the actuators of the mirrors 104 based on the detected position of the illumination beams and a preset target position of the illumination beams. The control device 110 may be configured to monitor the position of the output beam pattern continuously or at a predetermined interval. The control device 110 may be configured to obtain information about current position of the mirrors 104 from the actuators (e.g., via the feedback loop) and determine instructions for adjusting the current position of the mirror 104 to meet the target position (e.g., to tilt [calculated value] degrees in x- or y-axis). The instructions may be determined by the algorithm. After the actuator has adjusted the position of the respective mirror based on the instructions, the actuator may be configured to keep the adjusted position until new instructions are received. The instructions may comprise, for example, angular displacement parameters for at least one of horizontal steer adjustment or a vertical steer adjustment.

Alternatively, the control device 110 may be configured to provide information about the monitored positions of the illumination beams (e.g., image data) to the algorithm stored and run on another device configured for analysis. The analysis device may be configured to analyze the current position of the beams with respect to the target position of the beams with the machine vision algorithm and provide instructions for one or more of the mirrors 104 for beam steering. The analysis device may be external or internal component of the biomedical illumination device 100. The instructions may be provided to the one or more mirrors 104, for example, in a form of a transmitted control signal.

The biomedical illumination device 100 may further comprise a focusing system 114. The focusing system 114 may depend on application, and may be configured, for example, for flow cytometry application. Alternatively, the biomedical illumination device 100 may be configured to be coupled with the focusing system 114, or with different kinds of focusing systems for illumination of different kinds of samples, for example. A focusing system may be configured to focus the illumination beams to the sample.

The biomedical illumination device 100 may be configured to enable integrated power calibration. Active beam steering may allow for deflecting the beam for beam shape and power measurement for the calibration by the imaging system 110 without compromising the output power. For example, the imaging system 110 may comprise or be coupled to a power sensor configured to perform power measurement based on the sample received by the imaging device 110. If power calibration was performed from a partially deflected beam, there could be a partial power loss when measured as a few percent sample of the total power delivered to an application. Therefore, any changes in the beam quality could influence the calibrated power and cause varying accuracy.

The beam pattern formed by the system is defined by the design of the DOE integrated into it. While in flow cytometrical applications narrow line laser pattern is widely in use, for DNA sequencing applications a grid pattern can be generated. Depending on the particular application field, the DOE installed in the illumination system may be chosen accordingly. If the pattern requirements change, the DOE may be replaced by an operator with an appropriate one. Further, the operator may update information about the target illumination position/pattern 41 the beams stored, for example, at the imaging device 110 such that the actuator-controlled mirrors 104 are able to align the beams based on the new information.

Since the distance between beams can be adjusted with the (MEMS) mirrors, either separated or overlapping lines can be configured over time. The design of the illumination device may enable providing a compact solution to changing requirements in an illumination geometry of a sample in instances of modified flow cell designs or altered illumination patterns. The compact solution may be enabled as there is no need to design a completely new optical design upon changed illumination needs but same design with active beam steering can fulfil multiple specifications. Also, directly integrated laser technology combined with micro-optics (e.g., DOE) and MEMS technology may allow building compact modules, as opposed to mechanically adjusted mirrors and/or optical elements. Furthermore, utilization of MEMS mirrors may enable to reduce the effect of optical components drift over time. Automatic beam alignment and re-configuration may be carried out faster compared to manual work, and even during an operation of the device.

The biomedical illumination device 100 may have a modular structure. Hence, optical elements in the biomedical illumination device 100 may be configured to be detachable and replaceable. For example, the beam shaping element 108 may be changed when requirements for the beam pattern change. Further, broken mirrors 104 and/or their actuators may be changed when needed.

In an embodiment, the biomedical illumination device 100 may further comprise means for size adjustment of the output beams. The means may comprise a lens system, wherein at least some of the lenses are configured to controlled with actuators. The lens system may be configured to be coupled, for example, between the beam shaping element 108 and the focusing system 114. For example, the biomedical illumination device 100 may comprise a cylindrical adjustable telescope. The cylindrical adjustable telescope may comprise three cylindrical lenses or lens groups, two of which are configured to be movable using actuators. The cylindrical adjustable telescope may be configured to receive the beam pattern, such as laser lines, as an input, and to output the beam pattern with an adjusted size. With the cylindrical adjustable telescope, the length of the laser lines could be adjusted to the given application, e.g., to match the dimensions of a flow channel. This may also permit, at least to some extent, correction of the shape distortions due to aberrations in the optical path up to the flow channel. For example, the control device 110 may be configured to control the actuators of the cylindrical adjustable telescope based on at least one of a user input or analysis of the output beams. The user input may comprise, for example, the desired size of the laser lines according to the dimensions of the flow channel. The analysis may comprise comparing size data of the monitored output beams to a target size data of the beams. When the control device determines the difference between the current beam pattern position and the target beam pattern position, the position may refer to both size data and location data.

Figure 7:
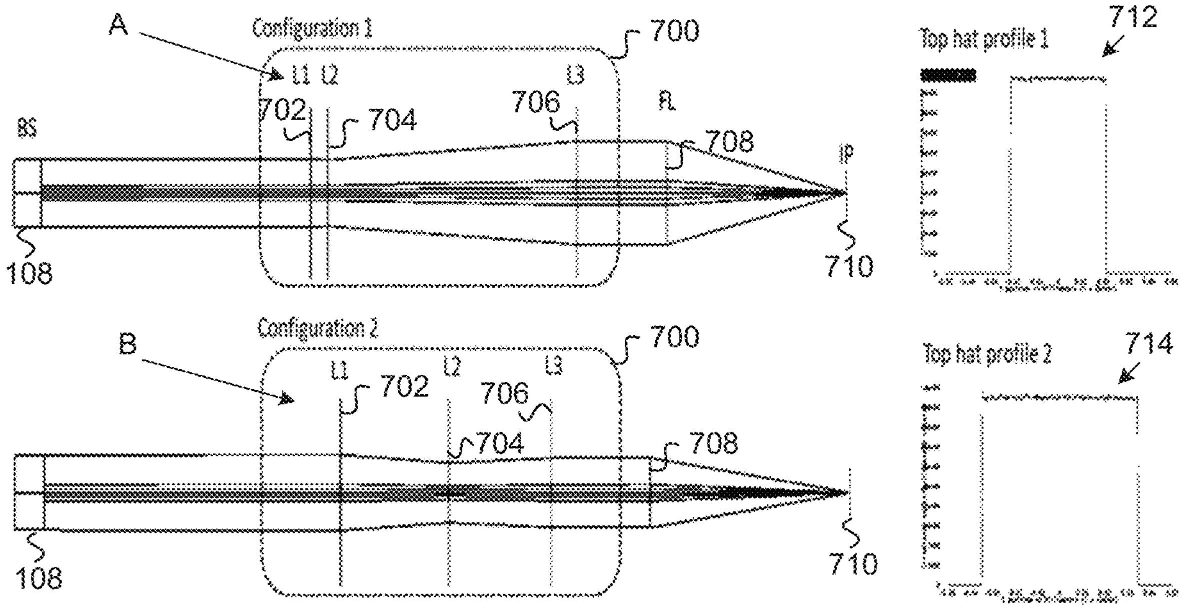
FIG. 7 illustrates an example of an optical system configured for size adjustment and resulting size adjustments with two different configurations of the optical system according to an example embodiment.

An example of an optical system 700 configured for size adjustment and resulting size adjustments with two different configurations of the optical system 700 is illustrated in FIG. 7. The optical system 700 may comprise a combination of three lens elements L1 702, L2, 704 and L3 706. The lens elements 702, 704, 706 are configured to provide an angular magnification of input beam between the beam shaping element BS 108 and a focusing lens FL 708. The focusing lens 708 may be part of the focusing system 114. As an example, two configurations of the optical system 700 are shown in FIG. 7 which result in different dimensions of a top hat profile in the image plane IP 710. Resulting top hat profile of a first configuration (upper optical system configuration A) is illustrated in an intensity graph 712 and resulting top hat profile of a second configuration (lower optical system configuration B) is illustrated in an intensity graph 714. A top hat profile may refer to a specific type of laser beam intensity or energy distribution characterized by its distinctive shape with an approximately flat plateau in the center (region of uniform intensity) and steep drop-offs at the edges indicating a rapid decrease in intensity. In the second configuration B, the lenses 702, 704, 706 are positioned approximate evenly from each other. In the first configuration A, the lens 702 is moved towards the beam shaping element 108, the lens 704 is moved closer to the lens 702, and lens 706 is moved toward the focusing lens 708 when compared to the second configuration B. The graphs 712 and 714 show how the different placement of lenses affect the size of the output beam from the optical system 700, that is, the resulting beam pattern is wider with the second configuration B than with the first configuration A. The optical system 700 can comprise any set of optical elements that provide an angular magnification to the output beam of the optical system 700. In particular, the optical system 700 can comprise cylindrical lenses that modify the top hat profile only in one dimension such that the length of the laser line (beam) can be adjusted precisely to the dimensions of the flow channel in a flow cytometry illumination system. The optical system 700 can further be designed to permit automatic adjustment. This can be accomplished by moving the lens elements L2 704 and L3 706 with respect to the lens element L1 702 such that the angular magnification of beam the output is changed continuously. This motion can be provided by motorized linear stages and controlled by a computing device implementing an active feedback loop between the desired top hat dimensions and the lens element positions.

Figure 2:
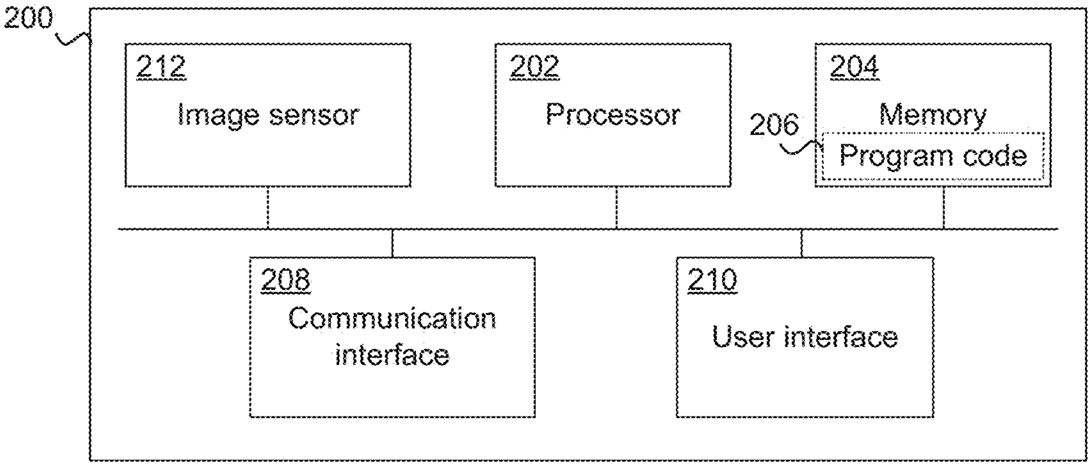
FIG. 2 illustrates an example of a device for automatic beam steering according to an example embodiment.

FIG. 2 illustrates an example of a device 200 for automatic beam steering in a biomedical illumination device according to an example embodiment. The device 200 may comprise or be coupled to, for example, the control device 110.

The device 200 may comprise at least one processor 202. The at least one processor 202 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device 200 may further comprise at least one memory 204. The memory 204 may be configured to store, for example, computer program code 206 or the like, for example operating system software and application software. In an embodiment, the program code 206 may comprise a machine vision algorithm. The machine vision algorithm may comprise a set of instructions to be carried out by a computing device for interpreting and analyzing visual data, such as images of beams of light. The memory 204 may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The device 200 may further comprise a communication interface 208 configured to enable the device 200 to transmit information to other devices, such as to MEMS. The communication interface 208 may be further configured to enable the device 200 to receive information from other devices, such as from a user device. For example, the device 200 may be configured to receive one or more target parameters for a light/beam pattern from the user device. The target parameters may comprise a target beam pattern and a target position of the target beam pattern at a sample to be illuminated. After evaluating beam pattern/position produced by a biomedical illumination device with respect to a focusing plane and the one or more target parameters, the device 200 may be configured to transmit instructions for one or more MEMS to change their position to adjust the current beam pattern/position. The evaluations may be configured to be performed continuously such that the current position of beam pattern can be aligned with a target position of the beam pattern and kept in the target position. The communication interface 208 may be further configured to provide instructions for one or more other devices, such as to light sources to adjust their power.

The communication interface 208 may be configured to provide at least one wireless radio connection, such as for example a 3GPP mobile broadband connection (e.g. 3G, 4G, 5G). However, the communication interface 208 may be configured to provide one or more other types of connections, for example a wireless local area network (WLAN) connection such as for example standardized by IEEE 802.11 series or Wi-Fi alliance; a short range wireless network connection such as for example a Bluetooth; a wired connection such as for example a local area network (LAN) connection, a universal serial bus (USB) connection or an optical network connection, or the like; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The device 200 may further comprise a user interface 210 comprising an input device and/or an output device. The input device may take various forms such a keyboard, a touch screen, or one or more embedded control buttons. The output device may comprise, for example, a display. The input device may be configured to receive instructions from a user for calibration of beams. The output device may be configured to provide information on current settings for the calibration, monitored data, performed adjustments on beam steering, and the like.

When the device 200 is configured to implement some functionality, some component and/or components of the device 200, such as for example the at least one processor 202 and/or the memory 204, may be configured to implement this functionality. Furthermore, when the at least one processor 202 is configured to implement some functionality, this functionality may be implemented using program code 206 comprised, for example, in the memory 204.

The functionality described herein may be performed, at least in part, by one or more computer program product components such as software components. According to an embodiment, the device 200 comprises a processor or processor circuitry, such as for example a microcontroller, configured by the program code when executed by the processor to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The device 200 may comprise means for performing at least one method described herein. In one example, the means comprises the at least one processor 202, the at least one memory 204 including instructions (e.g., comprised in the program code 206) configured to, when executed by the at least one processor 202, cause the device 200 to perform the method.

The device 200 may comprise for example a computing device. The device 200 may further comprise an imaging system configured to provide information on position of beams to the computing device. In an embodiment, the device 200 may comprise, or be configured to be coupled to, a biomedical illumination device. Although the device 200 is illustrated as a single device it is appreciated that, wherever applicable, functions of the device 200 may be distributed to a plurality of devices.

The device 200 may comprise, or be configured to be coupled to, at least one image sensor 212. The image sensor 212 may comprise, for example, a position sensitive detector, such as a camera. The position sensitive detector may be configured for position detection of light beams. For example, the position sensitive detector may be configured to measure a position of a beam pattern in one or two-dimensions on a sensor surface. Alternatively, the device 200 may be configured to receive information from such image sensor 212. The received information may comprise data on position of one or more imaged light beams. The position data may comprise information on positions of a plurality of light beams relative to a focusing plane. The position data may comprise a pattern of the light beams, comprising positions or locations and other parameters of the light beams in relation to each other. The position data may also comprise information on positions or locations of a plurality of light beams relative to a targeted sample position. Position data may comprise at least one of position of the whole beam pattern with respect to a reference position, positions of individual beams of the beam pattern with respect to at least one of reference positions of the individual beams or with respect to the other beams, or a size of the individual beams or the beam pattern with respect to a set target size. The device 200 may be further configured to store machine vision tools. For example, the device 200 may be configured to store an algorithm trained to detect deviations between an input image of a beam pattern and a target beam pattern.

The device 200 may be configured to receive as an input at least one of image data indicative of a position of a beam pattern or parameter data of the position (e.g., from the machine vision tools), and parameter data of a target position for the beam pattern. The device 200 may be configured to compare the position of the beam pattern to the target position of the beam pattern based on the image data and/or the parameter data. Based on the comparison, the device 200 may be configured to calculate instructions for steering one or more mirrors configured for beam adjustment. The device 200 may be configured to obtain position data of the one or more mirrors. The position of the beam pattern is linked with the position data of the mirrors. The position data of the mirror may comprise, for example, an angle and a tilt direction of the mirror with respect to a reference plane. The device 200 may be configured to determine how much and in what direction one or more of the mirrors needs to be steered (e.g., tilted) to arrive at the target position of the beam pattern. The device 200 may be configured to determine instructions to be transmitted to the mirrors based on the comparison, the instructions comprising at least one of adjustment instructions (to alter incline of the mirror based on direction and/or value instructions provided by the control device 200) or position instructions comprising target position parameters. The device 200 may store information on which mirror(s) are configured for adjustment of which beam(s) and/or the whole beam pattern. The device 200 may also store information on how different kinds of adjustments of positions of the mirrors cause changes in positions of individual beams and/or the in the position of the beam pattern. For example, if the device 200 detects that the whole beam pattern needs to be shifted to the right by a certain distance, the device 200 may know that for such adjustment instructions to tilt certain degrees in a certain direction is needed to be transmitted for a specific mirror. Further, if adjustment of a single beam line in the beam pattern is needed, the device 200 may know for which mirror(s) to send instructions, and to which direction and how much the mirror(s) need to be instructed to tilt based on a difference between the current and a target position of the beam line and a current position of the mirror(s).

The device 200 may be further configured to transmit instructions to other devices or components. For example, the device 200 may be configured to perform power calibration of the light sources based on the monitored beams. In addition, or alternatively, the device 200 may be configured to control positions of actuators of a cylindrical adjustment telescope configured for adjustment of line size of the beam. The positions may be control based on user input or based on the analysis of the beam pattern compared to the target beam pattern.

Figure 3:
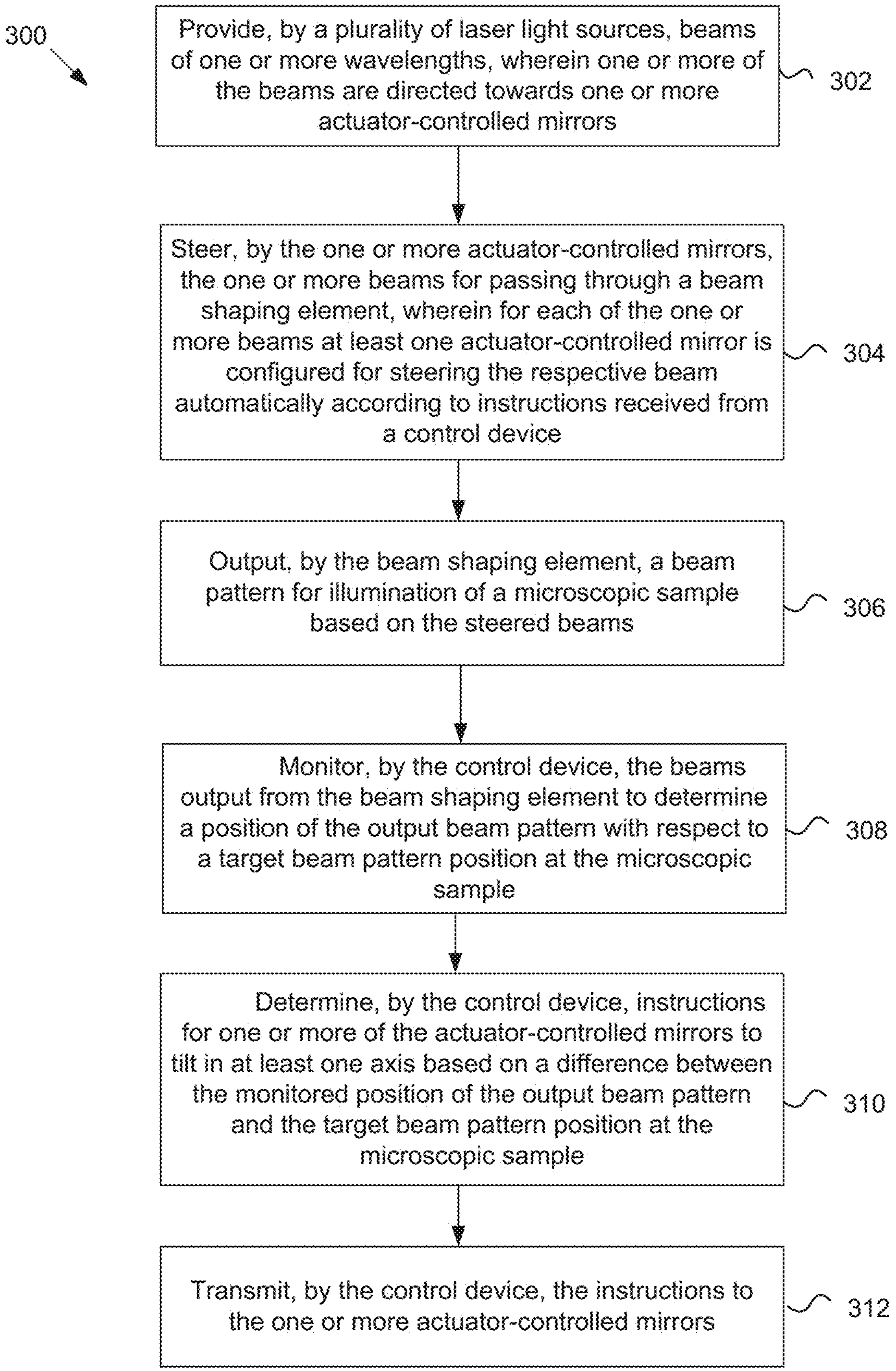
FIG. 3 illustrates an example of a method for biomedical according illumination to an example embodiment.

FIG. 3 illustrates an example of a method 300 for biomedical illumination according to an example embodiment. The method may be implemented, for example, with an illumination device comprising a combination of DOE and automated beam steering by MEMS for multi-wavelength biomedical illumination.

At 302, the method may comprise providing, by a plurality of laser light sources, beams of one or more wavelengths, wherein one or more of the beams are directed towards one or more actuator-controlled mirrors, such as MEMS mirrors.

At 304, the method may comprise steering, by the one or more actuator-controlled mirrors, the one or more beams for passing through a beam shaping element, wherein for each of the one or more beams at least one actuator-controlled mirror is configured for steering the respective beam automatically according to instructions received from a control device.

At 306, the method may comprise outputting, by the beam shaping element, a beam pattern for illumination of a sample based on the steered beams. The sample may be a microscopic sample, such as a cell. The sample may comprise a flow cell. Flow cells may refer to samples cells designed so that liquid samples can be continuously flowed through the beam path.

At 308, the method may comprise monitoring, by the control device, the beams output from the beam shaping element to determine a position of the output beam pattern with respect to a target beam pattern position at the sample.

At 310, the method may comprise determining, by the control device, instructions for one or more of the actuator-controlled mirrors to tilt in at least one axis based on a difference between the monitored position of the output beam pattern and the target beam pattern position at the sample.

At 312, the method may comprise transmitting, by the control device, the instructions to the one or more actuator-controlled mirrors.

Figure 4:
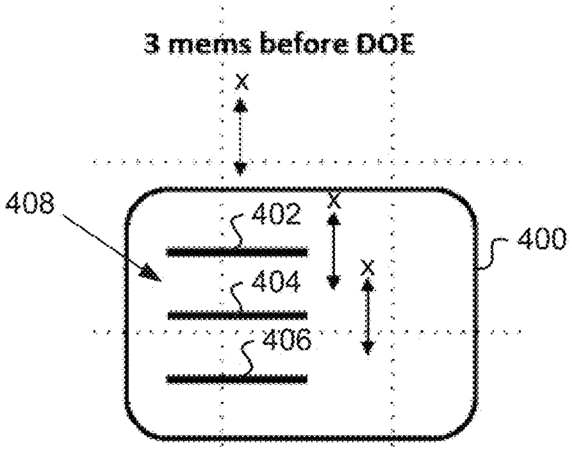
FIG. 4 illustrates an example beam adjustment configuration according to an example embodiment.

FIG. 4 illustrates an example beam adjustment configuration according to an example embodiment.

A biomedical illumination device may comprise, for example, three laser light sources and three MEMS mirrors before a beam shaping element. For example, two MEMS mirrors may be configured for two of the laser light sources such that beams 402, 404 can be adjusted individually with respect to position of the other beams 402, 404 and/or 406. In addition, the third MEMS mirror may be configured to adjust the whole beam pattern 408, i.e., all of the beams 402, 404, 406 at the same time. In this example, the MEMS are configured to provide adjustment of the individual beams 402, 404, 406 as well as the whole beam pattern 408 in a x direction with respect to the focusing plane 400. The beam shaping element may be implemented, for example, with one or more DOEs or one or more ROEs. The DOE or ROE may be configured to diffract/refract in one dimension. The two MEMS mirrors may be configured to move the beam(s) in the non-diffractive/refractive dimension without perturbing the diffraction pattern.

Figure 5:
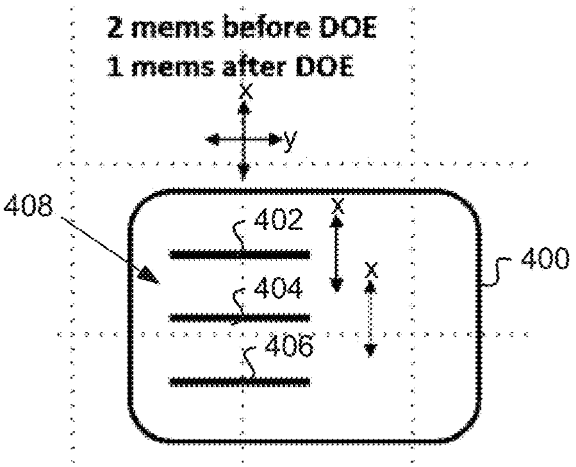
FIG. 5 illustrates another example beam adjustment configuration according to an example embodiment.

FIG. 5 illustrates another example beam adjustment configuration according to an example embodiment.

A biomedical illumination device may comprise, for example, three laser light sources and two MEMS mirrors before a beam shaping element. The biomedical illumination device may further comprise at least one MEMS mirror after the beam shaping element. In this example, the two MEMS mirrors positioned between the beam shaping element and the light sources may be configured to steer beams 402, 404 of two of the laser light sources individually such that positions of the beams 402, 404 may be adjusted with respect to positions of the other beams (402, 404 and/or 406) in a focusing plane 400. The two MEMS mirrors may be configured to provide adjustment of the beams in an x-direction of the focusing plane 400. The third MEMS mirror, positioned between the beam shaping element and the focusing plane, i.e., to a different side of the beam shaping element than the two MEMS mirrors, may be configured to enable adjustment of position of the whole beam pattern 408 both in x-direction and y-direction in the focusing plane 400.

Figure 6:
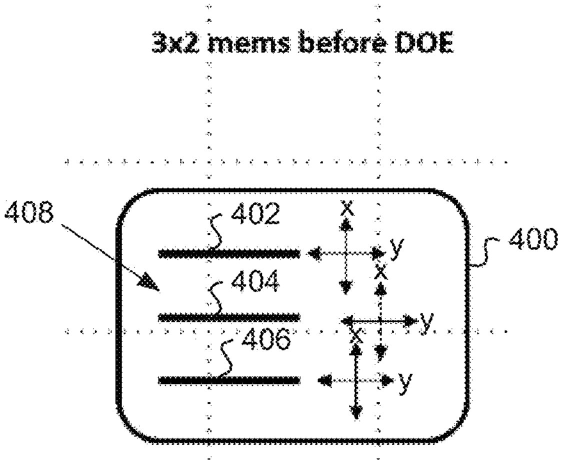
FIG. 6 illustrates another example beam adjustment configuration according to an example embodiment.

FIG. 6 illustrates another example beam adjustment configuration according to an example embodiment.

A biomedical illumination device may comprise three laser light sources and a pair of MEMS mirrors dedicated to each of the laser light sources, i.e., 3×2 MEMS mirrors. The biomedical illumination device may further comprise means for full top hat shape adjustment (e.g., DOE or ROE). The MEMS mirror pairs may be configured to change an angle of the respective beam at the DOE/ROE while maintaining the top hat position. The MEMS mirror pairs may be positioned between the laser light sources and the beam shaping element. The MEMS mirror pairs may be configured for adjusting beams of the laser light sources individually such that each of the beams 402, 404, 406 may be adjusted with respect to positions of the other beams 402, 404, 406 in the focusing plane 400. The MEMS mirror pairs may be configured to enable adjustment of position of the individual beams 402, 404, 406 in both x-direction and y-direction in the focusing plane 400. The additional MEMS mirror(s) may be further configured to enable adjustment of the whole beam pattern 408 in the focusing plane 400.

Figure 8:
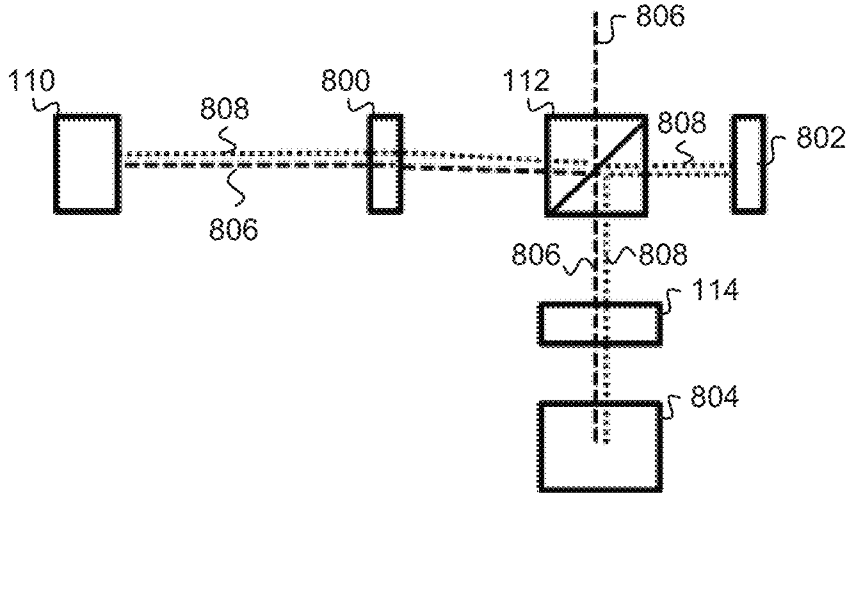
FIG. 8 illustrates an example of an arrangement for combined beam observation and target imaging beam path according to an example embodiment.

FIG. 8 illustrates an example of an arrangement for combined beam observation and target imaging beam path according to an example embodiment. The arrangement may be comprised in the biomedical illumination device 100.

In FIG. 8, an illumination beam 806 from light source(s) is configured to enter a beam splitter 112. The beam splitter 112 may be configured to function as an image combiner. A mirror 802 may be configured at an open port of the beam splitter 112. Hence, a target structure 804 may be imaged through two lens systems. The two lens systems may comprise a focusing system 114 for the target structure 804 and a focusing system 800 for camera imaging. The target structure 804 may comprise, for example, a flow cell or a reference cell. The illumination beam 806 may be configured to enter a control device 110 comprising an imaging camera via the beam splitter 112 and the focusing system 800. A beam path for target structure imaging is illustrated by beam 808. For example, the beam 808 may comprise back-reflected light or parasitic fluorescence signal from the target structure 804. The imaging may comprise overlaying the image of the beam 808 of the target structure with image the illumination beam 806. Hence, the arrangement of FIG. 8 may allow simultaneous observation and metrology of multi-color structured illumination light spot(s) (illumination beam(s) 806) and the target structure 804.

Alignment of the illumination beam 806 can be performed by placing a reference sample at the place of the target structure 804. The reference sample can be, for example, the target structure itself or a special structure which has same mechanical dimensions but different optical properties than the actual target structure. The purpose here is to provide a mark in a target focal plane and at the same time make the illumination beam 806 (at least one of them) focused at the focusing system 114 visible by reflection or fluorescence, resulting the beam(s) 808. Making the target structure 804 and the illumination beam 806 visible from the same source plane may enable to bring them to an overlap. Once this calibration is carried out, the illumination beam 806 can be brought to the same position in the target plane by aligning it to the calibrated reference position on the imaging camera. The control device 110 may be configured to adjust position of one or more components of the biomedical illumination device 100 to adjust the position of the illumination beam 806.

During initial beam alignment, the goal is to bring the excitation light path, the detection light path and a sample stream into a mutual intersection. For example, labelled fluorescence beads may be used for the alignment to arrive at a state where a maximum signal on the detector (imaging camera) is obtained. The arrangement of FIG. 8 can further comprise an oscillator configured to observe amplified detector output pulses. Nonsymmetric pulses would indicate misalignment of at least some of the components of the arrangement and the resulting beam pattern. The initial beam alignment may first comprise an iteration step, wherein various optical depth of fields (DOFs) are adjusted while monitoring a raw signal on the oscilloscope for maximum intensity and tightness. With the detector, it may be monitored that each element is adjusted to the tightest focus of the laser beam. Then, in a next step, one of the elements may be deoptimized to see if adjustment would produce better performance.

In addition to the initial beam alignment, maintenance alignment may be performed periodically and/or when the biomedical illumination device 100 is activated. For alignment regular checks, the fluorescence beads with known intensity levels may be run. Then, observed intensities can be compared against the intensities measured right after the initial alignment. Voltages of the detector can be then calibrated until peaks of the fluorescence beads match previously recorded target values.

It is obvious to a person skilled in the art that with the advancement of technology, the basic idea of the invention may be implemented in various ways. The invention and its embodiments are thus not limited to the examples described above, instead they may vary within the scope of the claims.

Further features of the methods directly result from the functionalities and parameters of the device as described in the appended claims and throughout the specification and are therefore not repeated here. It is noted that one or more operations of the method may be performed in different order.

A device may be configured to perform or cause performance of any aspect of the method(s) described herein. Further, computer program may comprise instructions for causing, when executed, a device to perform any aspect of the method(s) described herein. Further, a device may comprise means for performing any aspect of the method(s) described herein. According to an example embodiment, the means comprises at least one processor, and memory including program code, the at one memory and the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

The terms 'automated', 'automatically', 'automatic' and variations thereof, as used herein, may refer to any process or operation done without human input when the process or operation is performed. However, a process or operation can be automatic, even though performance of the process or operation uses human input, if the input is received before performance of the process or operation.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A biomedical illumination device, comprising:

a plurality of laser light sources configured to provide beams of one or more wavelengths, wherein one or more of the beams are directed towards one or more actuator-controlled mirrors;

the one or more actuator-controlled mirrors configured to steer the one or more beams for passing through a beam shaping element, wherein for each of the one or more beams at least one actuator-controlled mirror is configured for steering the respective beam automatically according to instructions received from a control device;

the beam shaping element configured to output a beam pattern for illumination of a microscopic sample based on the steered beams; and the control device configured to:

monitor the beams output from the beam shaping element to determine a position of the output beam pattern in relation to a target beam pattern position at the microscopic sample;

determine instructions for one or more of the actuator-controlled mirrors to tilt in at least one axis based on a difference between the monitored position of the output beam pattern and the target beam pattern position at the microscopic sample; and transmit the instructions to the one or more actuator-controlled mirrors.

2. The biomedical illumination system of claim 1, wherein the actuator-controller mirror comprises a micro-electromechanical system, MEMS, mirror.

3. The biomedical illumination system of claim 1, wherein the beam shaping component comprises a diffractive optical element, DOE or a refractive optical element, ROE.

4. The biomedical illumination device of claim 1, further comprising:

at least one actuator-controlled mirror configured for steering the combination of all output beam patterns as a whole beam pattern and positioned at least one of between the beam shaping element and the microscopic sample or between the one or more actuator-controlled mirrors and the beam shaping element; and wherein the control device is further configured to transmit instructions for the at least one actuator-controlled mirror configured for steering the whole beam pattern based on the difference between the monitored position of the output beam pattern and the target beam pattern position at the microscopic sample.

5. The biomedical illumination device of claim 1, further comprising:

one or more dichroic beam combiners configured to guide the beams from the actuator-controlled mirrors to the beam shaping element.

6. The biomedical illumination device of claim 1, further comprising a beam sampler configured to provide a sample of the output beams to the control device for monitoring of the position of the output beam pattern.

7. The biomedical illumination device of claim 1, wherein the biomedical illumination device has a modular structure.

8. The biomedical illumination device of claim 1, wherein the control device is further configured to perform power calibration of the plurality of laser light sources based on the monitored output beams.

9. The biomedical illumination device of claim 1, wherein the beam shaping element is configured to output at least one of a line pattern, a grid pattern, a circular pattern, or a ring pattern of beams.

10. The biomedical illumination device of claim 1, comprising:

an actuator-controlled lens system configured for size adjustment of the beam pattern; and wherein the control device is further configured to control the actuators of the lens system based on the monitored output beams and target size data of the beams.

11. A method, comprising:

providing, by a plurality of laser light sources, beams of one or more wavelengths, wherein one or more of the beams are directed towards one or more actuator-controlled mirrors;

steering, by the one or more actuator-controlled mirrors, the one or more beams for passing through a beam shaping element, wherein for each of the one or more beams at least one actuator-controlled mirror is configured for steering the respective beam automatically according to instructions received from a control device;

outputting, by the beam shaping element, a beam pattern for illumination of a microscopic sample based on the steered beams;

monitoring, by the control device, the beams output from the beam shaping element to determine a position of the output beam pattern with respect to a target beam pattern position at the microscopic sample;

determining, by the control device, instructions for one or more of the actuator-controlled mirrors to tilt in at least one axis based on a difference between the monitored position of the output beam pattern and the target beam pattern position at the microscopic sample; and transmitting, by the control device, the instructions to the one or more actuator-controlled mirrors.

12. The method of claim 11, wherein the actuator-controller mirror comprises a microelectromechanical system, MEMS, mirror.

13. The method of claim 11, wherein the beam shaping component comprises a diffractive optical element, DOE, or a refractive optical element, ROE.

14. The method of claim 11, further comprising:

steering the combination of all output beam patterns as a whole beam pattern by at least one actuator-controlled mirror positioned at least one of between the beam shaping element and the microscopic sample or between the one or more actuator-controlled mirrors and the beam shaping element; and transmitting, by the control device, instructions for the at least one actuator-controlled configured for steering the whole beam pattern based on the difference between the monitored position of the output beam pattern and the target beam pattern position at the microscopic sample.

15. The method of claim 11, further comprising:

guiding the beams from the actuator-controlled mirrors to the beam shaping element by one or more dichroic beam combiners.

16. The method of claim 11, further comprising: providing, by a beam sampler, a sample of the output beams to the control device for monitoring of the position of the output beam pattern.

17. The method of claim 11, wherein the biomedical illumination device has a modular structure.

18. The method of claim 11, comprising:

performing, by the control device, power calibration of the plurality of laser light sources based on the monitored output beams.

19. The method of claim 11, wherein the beam shaping element is configured to output at least one of a line pattern, a grid pattern, a circular pattern, or a ring pattern of beams.

20. The method of claim 11, comprising:

controlling, by the control device, actuators of an actuator-controlled lens system configured for size adjustment of the beam pattern based on the monitored output beams and the target size data of the beams.

* * * * *